March 25, 1930.   E. E. FOSTER   1,752,072
HYDRAULIC SHOCK ABSORBER
Filed March 10, 1928   2 Sheets-Sheet 2
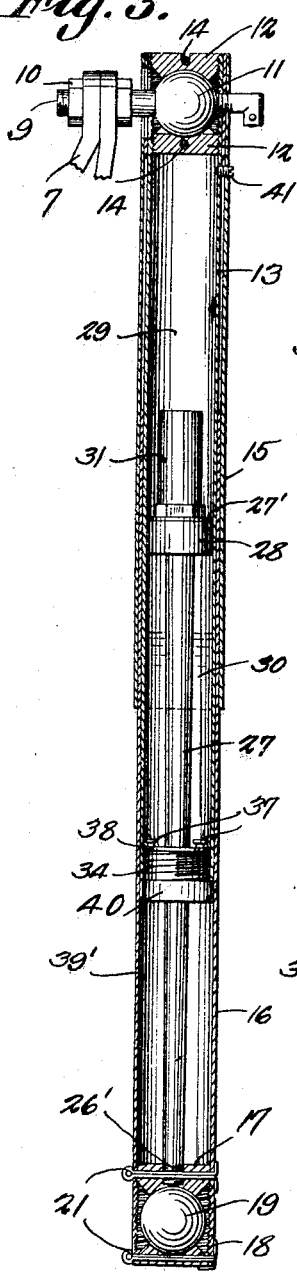
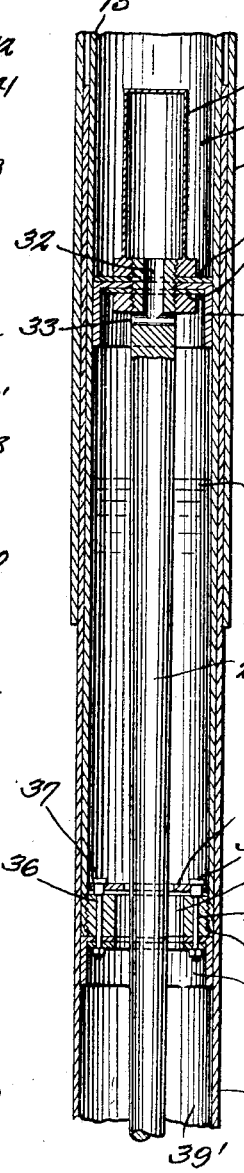
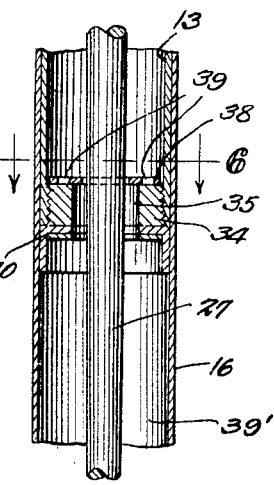
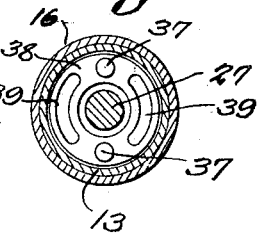
Edwin E. Foster
Inventor
By C. A. Snow & Co.
Attorneys.

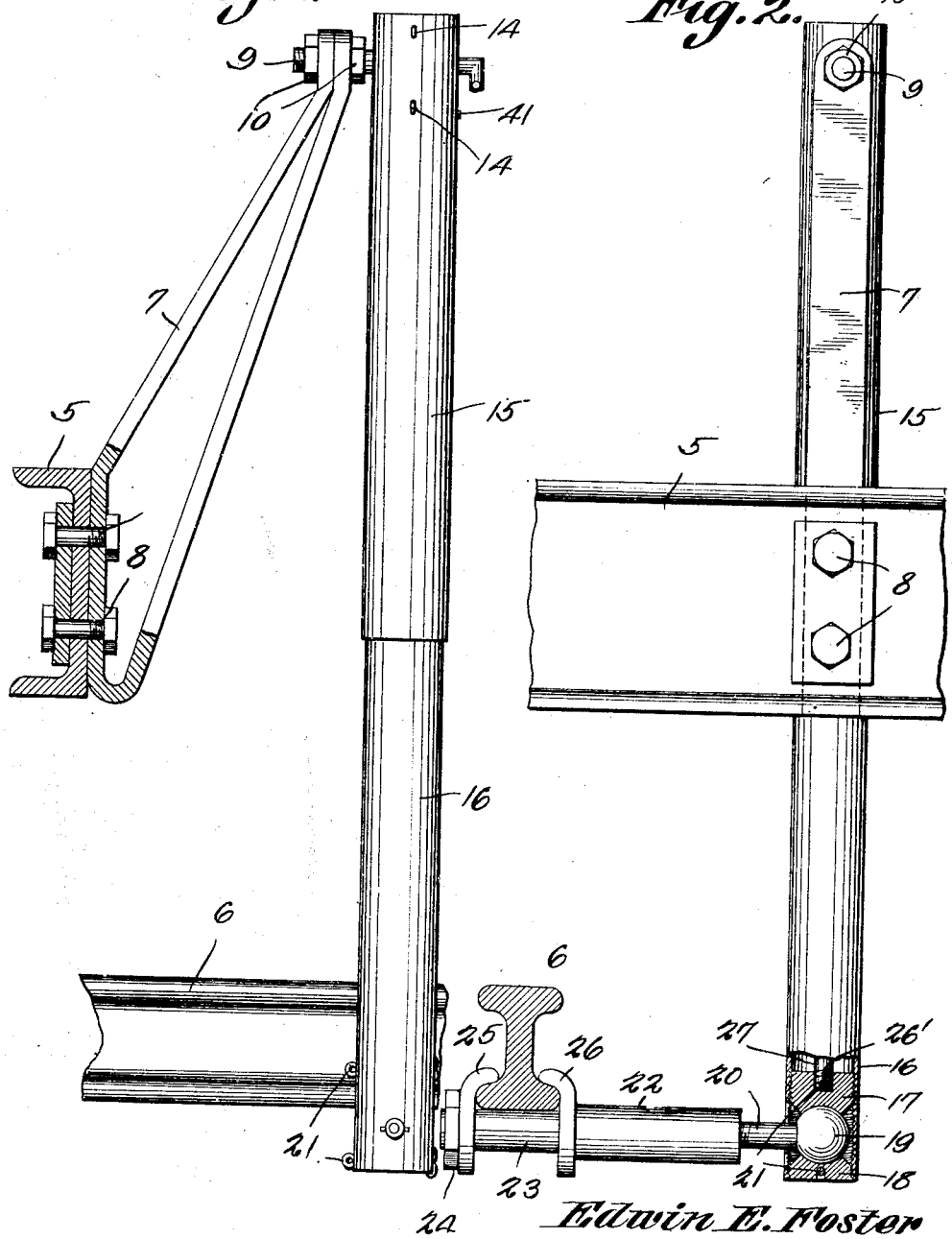

Patented Mar. 25, 1930

1,752,072

UNITED STATES PATENT OFFICE

EDWIN EARL FOSTER, OF AUSTIN, TEXAS

HYDRAULIC SHOCK ABSORBER

Application filed March 10, 1928. Serial No. 260,633.

This invention relates to shock absorbers and more particularly to shock absorbers of the hydraulic type especially designed for use in connection with motor vehicle.

An important object of the invention is to provide a device of this character which will operate efficiently under loads of various weights, the construction of the device being such that the elements thereof will adjust themselves to various loads.

Another object of the invention is to provide an air chamber in which air will be compressed, by the action of the liquid in the device when the body of the vehicle moves downwardly under the load.

A still further object of the invention is to provide a shock absorber which will relieve the springs of the vehicle of undue strain usually directed thereto, when the rebound takes place.

With the foregoing and other objects in view which will appear as the description proceeds the invention resides in the combination and arrangement of parts and in the details of construction hereinafter described and claimed, it being understood that changes in the precise embodiment of the invention herein disclosed may be made within the scope of what is claimed, without departing from the spirit of the invention.

Referring to the drawings:

Figure 1 is an elevational view of a shock absorber constructed in accordance with the invention, the side rail of the vehicle supporting the absorber, being shown in section.

Figure 2 is an elevational view taken at right angles to Figure 1, the lower portion of the shock absorber being shown in section.

Figure 3 is a longitudinal sectional view through the shock absorber.

Figure 4 is a fragmental sectional view through the absorber, on an enlarged scale.

Figure 5 is an enlarged fragmental sectional view through the valve at the lower end of the inner tube of the shock absorber, and Figure 6 is a sectional view taken on line 6—6 of Figure 5.

Referring to the drawing in detail, the reference character 5 designates a side rail of the chassis of a motor vehicle to which the device is secured, and the reference character 6 designates an axle thereof.

The reference character 7 designates a bracket which is bolted to the side rail 5 by means of the bolts 8, the upper end of the bracket being secured to the bolt 9 by means of the nuts 10 threaded on one end of the bolt.

This bolt 9 carries a ball 11 at its inner end, which ball rests between the bearings 12 that are adjustably secured within the upper end of the inner tubular member 13, so that universal movement of the shock absorber with respect to its bracket, will be permitted at all times. Cotter keys 14 pass through the tubular members and engage the bearing members 12 to lock the bearing members 12 in proper relation with respect to each other.

The tubular members 13 and 15 are disposed in spaced relation with each other so that the lower tubular section 16 may move therebetween. At the lower end of the tubular member 16 are spaced bearing members 17 and 18 respectively, between which the ball 19 of the bolt 20, is disposed so that a universal connection is provided between the bolt 20 and tubular member 16. Cotter keys 21 extend through the bearing members 17 and 18 and hold them against rotary movement to the end that the device is securely held in position at all times.

This bolt 20 extends into the threaded extremity of the tubular member 22 that has a forward threaded extremity to receive the nut 24 that holds the clamp 25 in position. A clamp indicated at 26 is formed at one end of the member 22 and cooperates with the member 25 in clamping the device in position on the axle of the vehicle which is indicated at 6. The bearing member 17 is formed with a threaded opening to receive the threaded extremity 26' of the tapered piston rod 27, the rod being tapered towards its lower end for purposes to be hereinafter more fully described.

Mounted on the upper end of the rod 27 is a piston embodying disks 27' between which the inverted cup-shaped washer 28 is held, the washer acting as a means to prevent liquid from passing between the piston head and tubular member in which it operates.

The piston also divides the inner tubular member into an upper compartment 29 and a lower compartment 30, the upper compartment 29 defining an air compartment, while the lower compartment 30 contains oil. As shown, the upper end of the rod 27 extends through the piston and is threaded to receive the hollow member 31 that defines an air chamber, the member 31 being in communication with the compartment 30 through the longitudinal bore 32 formed in one end of the rod 27, and the transverse bore 33 that connects with the bore 32 at the lower end thereof. The piston operating in the air compartment 29 acts to retard movement of the piston when the vehicle to which the device is secured, passes over comparatively small irregularities in the road surface eliminating snubbing under normal conditions.

Secured at the lower end of the tubular member 13 is a piston embodying the threaded member 34 fitted within threads formed on the interior of the member 13, the member 34 being provided with an opening 35 through which the rod 27 extends. Bolts 36 extend through the member 34 and are provided with heads 37 on which the valve member 38 moves, the bolt heads being substantially long so that the valve 38 may move vertically thereover. This valve member 38 is provided with curved elongated openings 39 through which the liquid may pass from the lower section 39' of the tubular member 16, to the upper portion thereof, but it will be seen that when the member 13 moves upwardly, this upward movement causes the valve to seat on the member 34 to close the openings 39 restricting the flow of liquid to the central opening of the member 24 to retard upward movement of the member 13 under the rebound.

An inverted cup-shaped washer 40 is secured to the member 34 by means of the bolts 36 and prevents the passage of liquid around the member 34. A plug 41 is passed through registering threaded openings in the tubular members 13 and 15 and may be removed so that the supply of liquid in the tubular member may be replenished.

Due to the fact that the rod 27 is tapered, it will be obvious that when the vehicle equipped with the device is heavily loaded, the rod will be forced to a position so that the opening between the rod and member 34 will be increased in diameter to lessen the resistance, on the downward movement of the vehicle body.

It will further be seen that as the member 34 moves downwardly, the liquid moves from a large compartment 39' into a contracted compartment 30 which compresses air in the air chamber 31 to restrict movement of the member 34. As the telescoping sections of the absorber move to their normal positions it is obvious that the upward movement of the member 35 causes the valve member 38 to seat, closing the openings 39 and restricting the passage of fluid to the central opening of the valve to retard the movement of the vehicle on the rebound.

I claim:

1. In a shock absorbing device, telescoping members, means for securing one of said telescoping members to the chassis of a vehicle, means for securing the other telescoping member to the axle of the vehicle, a member having a central opening to permit oil to pass therethrough, secured within one of the telescoping members, a rod secured within one of the telescoping members and extending through the opening in the member positioned in the first mentioned telescoping member, said telescoping members containing oil, an air chamber on the upper end of the rod, and the oil in the telescoping members adapted to compress air in the air chamber when the telescoping members are moved towards each other.

2. In a shock absorber, a body portion including telescoping sections, means at one end of one of the telescoping sections for restricting the passage of oil contained in the body portion, from one section to the other, a rod secured to one section and extending into the other section, means on the free end of the rod for preventing the passage of oil beyond the free end of the rod, an air chamber on the free end of the rod, and the oil in the body portion adapted to compress air in the air chamber to restrict movement of the telescoping sections with respect to each other.

3. In a shock absorber, telescoping tubular sections, a valve supporting member secured at one end of one of the tubular sections and having a central opening, a tapered rod carried by one of the tubular sections and extending through the opening in the valve supporting member, means at the upper end of the rod for restricting the passage of oil through the telescoping members, an air chamber at the upper end of the rod, the oil in the tubular sections adapted to compress air in the air chamber, and said tapered rod adapted to vary the size of the opening in the valve supporting member.

4. In a shock absorber, a body portion including vertically operating telescoping tubular sections, a valve supporting member having a central opening and secured at one end of one of the tubular sections, a rod tapered towards its lower end, said rod being secured to one of the sections and extending through the valve member to vary the size of the opening in the valve supporting member to regulate the passage of oil contained in the body portion, through the valve supporting member, and means at the upper end of the rod for restricting the passage of oil above the upper end of the rod.

5. In a shock absorber, a body portion including telescoping upper and lower sections, a valve supporting member having an enlarged central opening, secured to the upper section, a tapered rod carried by the lower section and extending through the opening in the valve supporting member, the free end of the rod extending into the upper tubular section, a vertically movable disk valve on the valve supporting member and adapted to operate to allow oil contained in the body portion to pass upwardly therethrough when the tubular sections are moved towards each other, said valve adapted to restrict the passage of oil through the body portion when the tubular sections move away from each other, and means at the upper end of the rod for preventing the passage of oil above the upper end of the rod.

6. In a shock absorber, a body portion including telescoping sections, a valve member secured at one end of one of the sections to control the passage of liquid from one section to the other, a rod secured to the other section and extending through the valve, a piston on the upper end of the rod and operating in one of the sections, an air chamber mounted on the piston, said rod having bores to permit air to pass from the telescoping sections to the air chamber, and the oil in the telescoping sections adapted to compress air in the air chamber to retard movement of the sections.

In testimony that I claim the foregoing as my own, I have hereto affixed my signature.

EDWIN EARL FOSTER.